…

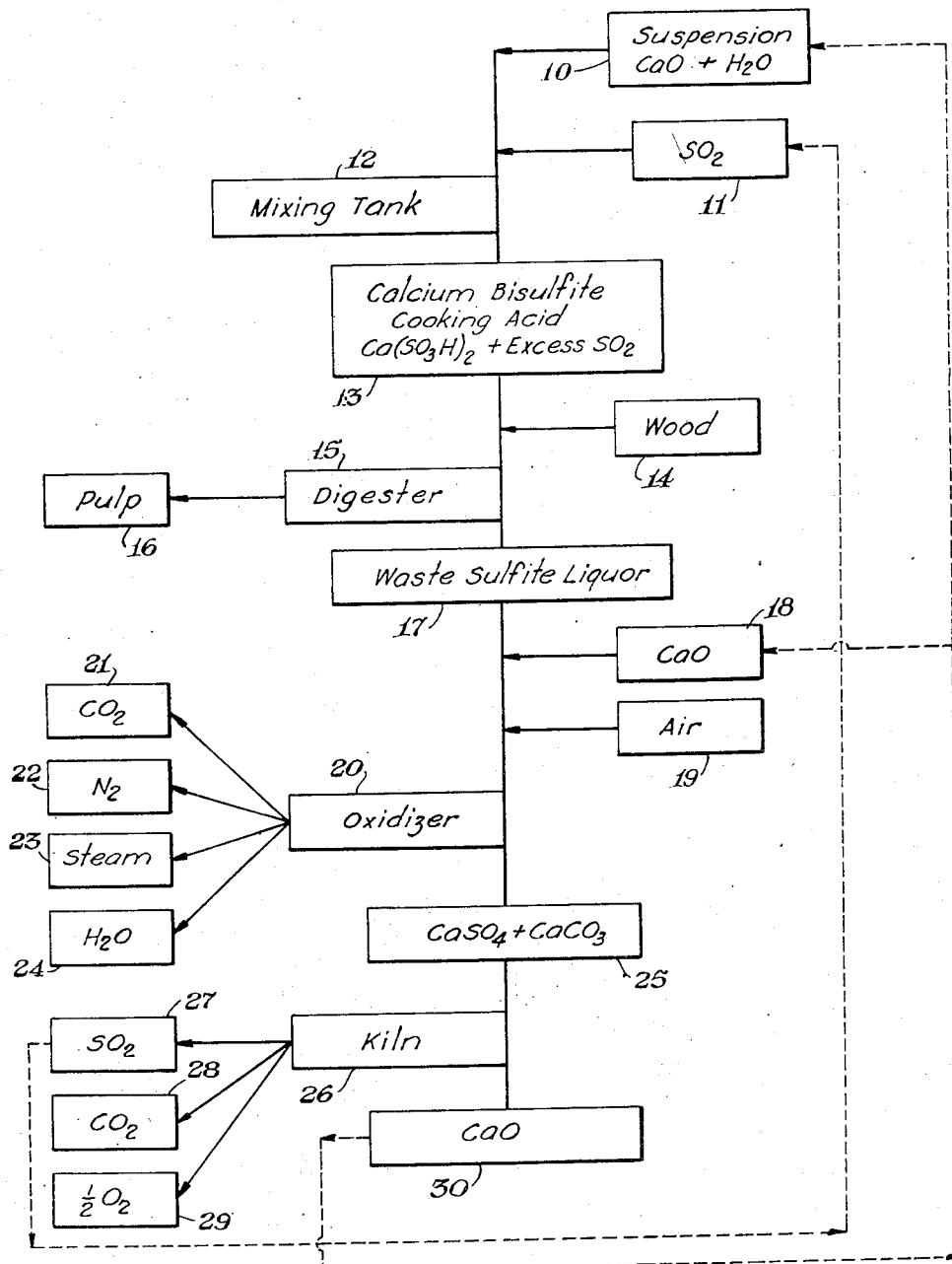

United States Patent Office

2,696,424
Patented Dec. 7, 1954

2,696,424

PREPARATION OF CALCIUM BISULFITE COOKING ACID FROM WASTE SULFITE LIQUOR

Eugene W. Schoeffel, Rothschild, Wis., assignor to Sterling Drug Inc., New York, N. Y., a corporation of New York Application June 16, 1951, Serial No. 232,006

4 Claims. (Cl. 23—131)

The present invention relates to the sulfite pulping of wood and is more particularly concerned with an improved cycle for the regeneration of calcium bisulfite cooking acid from waste sulfite liquor.

In the sulfite pulping process, calcium bisulfite, $Ca(SO_3H)_2$, is customarily used as the digesting cooking acid or liquor to dissolve the non-cellulosic pulp constituents, chiefly lignin, thus freeing the desired cellulose fibers for subsequent use in the manufacture of paper, rayon, or other wood products. The cooking acid is conventionally prepared by reacting suspensions or slurries of calcium carbonate or calcium oxide and water with sulfur dioxide, or, occasionally by reacting calcium sulfite ($CaSO_3$) and water with sulfur dioxide. Large quantities of the spent cooking acid, referred to as "waste sulfite liquor," frequently containing up to fifty percent of the original weight of the pulp so treated, are obtained. As a result, there is created the problem of disposal of enormous quantities of waste sulfite liquor. This has been approached in various ways, one of which has been the suggested regeneration of the cooking acid from the inorganic salts present in the waste sulfite liquor.

Therefore, it is an object of the present invention to provide a method for the regeneration of calcium bisulfite cooking acid from waste calcium sulfite liquor. It is an additional object of the present invention to provide a method for the preparation of calcium bisulfite cooking acid that involves the substantially complete oxidation in aqueous phase of calcium waste sulfite liquor. Another object of the present invention is to provide a method for the preparation of calcium bisulfite cooking acid from calcium sulfate ($CaSO_4$) obtained from the calcium waste sulfite liquor. A further and more detailed object of the present invention is to provide a method useful for the preparation of calcium bisulfite cooking acid from calcium waste sulfite liquor without forming excessive quantities of insoluble calcium scale in the reactor utilized in the oxidation phase. Another object of the present invention is to provide a method for the preparation of calcium bisulfite cooking acid that involves the recovery and regeneration of substantially all the inorganic materials present in the calcium waste sulfite liquor. A still further object of the present invention is to provide a method for the preparation of calcium bisulfite cooking acid from waste sulfite liquor that produces, concomitantly, a harmless aqueous residue of low biochemical oxygen demand from the waste sulfite liquor.

Heretofore, many procedures for the recovery of cooking acid from the waste sulfite liquor have been suggested. These have usually involved the principle of evaporation, concentration, partial oxidation, or, precipitation. In one method, the waste sulfite liquor was completely evaporated to dryness and subsequently burned in an effort to obtain an ash containing calcium salts suitable for use in preparing fresh cooking acid, but excessive calcium and magnesium scale formation in the evaporator seriously reduced the effectiveness of the procedure. In one subsequent modification, hot gases were reacted with falling droplets of waste sulfite liquor using a submerged torch device in order to prevent excess scaling.

In the evaporation methods, the residue is incinerated or roasted to obtain the inorganic constituents that are utilized in the preparation of additional cooking acid. The combustion product usually contains substantial quantities of calcium sulfite, calcium sulfide, and other calcium salts containing sulfur. The leaching or dissolving of these salts in water is inefficient and unsatisfactory because of their agglomeration with the infusible ash resulting from the combustion of the evaporation residue from the waste sulfite liquor. In addition, the presence of the sulfides and thiosulfates hinders the leaching out of the desired sulfites.

More recently, a concentration procedure has been reported in which the waste sulfite liquor is first evaporated to a predetermined concentration only, and then heated to remove the combustible organic elements present in the concentrated liquor. The desired inorganic materials are subsequently recovered from the combustion gases and residual ash. These methods involving evaporation, followed by combustion, are not economical because there are produced insufficient amounts of heat by the oxidation of the carbonaceous material to maintain the combustion of the waste sulfite liquor, and therefore external heat must be supplied continually in the combustion operation.

The most efficient precipitation procedure known in the prior art involves the precipitation of calcium sulfite ($CaSO_3$) from the waste sulfite liquor through the use of lime and a carefully regulated pH which tends to minimize the quantity of organic material adsorbed upon the surface of the precipitated calcium sulfite crystals. Fresh quantities of calcium bisulfite cooking acid are then prepared from the calcium sulfite by reaction with sulfur dioxide and water. However, in such process, the disposal problem is still acute because large amounts of organic material in the residual waste sulfite liquor must be further treated.

To date, no efficient, economical procedure for the preparation of fresh quantities of cooking acid from the raw waste sulfite liquor has been developed of which I am aware.

I have found now a method by which an approximately theoretical amount of calcium bisulfite cooking acid can be regenerated from raw waste sulfite liquor. Accordingly, my invention comprises a series of steps in a sulfite pulping process in which the waste sulfite liquor is substantially completely oxidized in the liquid phase to yield calcium sulfate and calcium carbonate, which are then roasted to yield calcium oxide and sulfur dioxide, chiefly, and in which an aqueous suspension of the calcium oxide obtained in the roasting step is reacted with sulfur dioxide also obtained in the roasting step to produce fresh calcium bisulfite cooking acid. My invention is characterized by the fact that the oxidation phase is carried out in the presence of calcium oxide and in the aqueous phase so that no prior evaporation or concentration procedures are required, thus evidencing the superiority of this step in my method over those prior art procedures which require the use of costly, time-consuming evaporation and concentration steps. My invention is further characterized by the fact that a stoichiometric balance is obtained, save for mechanical losses, in the oxidizing phase of the invention. As a result, only one-half of the calcium oxide obtained in the roasting step is required for the reaction with sulfur dioxide to produce the fresh calcium bisulfite cooking acid, the remaining one-half calcium oxide being effectively used to maintain approximate neutrality of the sulfur compounds formed in the oxidizing reaction, thereby preventing corrosion of the steel equipment. My invention is also characterized by the fact that sulfur dioxide, almost completely free from contamination with sulfur trioxide, can be obtained in the roasting step in almost quantitative yield from the calcium sulfate for use in the regeneration of the cooking acid.

Thus, the invention is more particularly characterized by a sequence of operating steps which provides for the complete oxidation in liquid phase of raw waste sulfite liquor yielding a calcium sulfate residue which can be roasted to produce calcium oxide and sulfur dioxide, useful in part in neutralizing the waste sulfite liquor and in part in the regeneration of cooking acid upon reaction with sulfur dioxide also obtained from the roasting procedure.

In the annexed drawing the single figure is a flow diagram illustrating schematically one method of practicing my invention as applied to a sulfite pulping process.

The flow sheet and the general sulfite pulping cycle as hereinafter described will be considered as being completely in equilibrium. From the following description, it will be apparent to one skilled in the art how to start and build up to a state of equilibrium in which the starting materials are introduced into the general pulping cycle at substantially the same rate at which the products are removed from it.

Referring now to the drawing:

A suspension 10 of calcium oxide and water is mixed with sulfur dioxide 11 in a suitable tank 12 to produce calcium bisulfite cooking acid 13, $Ca(SO_3H)_2$, containing an excess of sulfur dioxide. The cooking acid 13 is then contacted with pulp wood 14 in a standard digester 15, and the cellulose pulp 16 separated from the waste sulfite liquor 17. To the waste sulfite liquor 17, calcium oxide 18 is added and the mixture treated with air 19 in an oxidizer tower 20 under high pressure. The gaseous oxidation products, viz., carbon dioxide 21, nitrogen 22 and steam 23, and liquid water 24 are vented from the reaction tower 20. The solids 25 from the reaction tower 20 are roasted in a kiln 26 to obtain sulfur dioxide 27, carbon dioxide 28 and oxygen 29, and the solid calcium oxide 30 is recovered and recycled, along with the recovered sulfur dioxide 27, to furnish starting materials 10 and 11, from which fresh cooking acid 13 may be prepared.

The following example illustrates the practice of the present invention and will be described with the drawing.

*Example*

A suspension of calcium oxide (CaO) and water, containing 12.2 tons of calcium oxide, was mixed with 24.3 tons of sulfur dioxide ($SO_2$) in a suitable mixing tank to produce 38.9 tons of calcium bisulfite cooking acid $Ca(SO_3H)_2$, containing an excess of sulfur dioxide. The cooking acid was then reacted with 300 tons of pulp wood in a digester and the pulp, containing the cellulosic fibers of the wood, was then separated from the waste sulfite liquor, containing primarily the calcium salts of lignin sulfonic acid, free sulfur dioxide, and minor pulp constituents such as carbohydrates, resins, oils and proteins.

The volume of waste sulfite liquor thus produced contained 170 tons of total dry solids having the following composition:

(1) 90.0 grams/per liter of total solids
(2) 6.5 grams/per liter of calcium oxide
(3) 6000 B. t. u. per gallon
(4) an oxygen demand of 120.0 grams per liter
(5) 6.5 grams/per liter of sulfur as sulfur dioxide.

In the ensuing oxidation phase, the necessary apparatus consisted of a pump for continuously charging the reactor with raw waste sulfite liquor, an air compressor, a tower reactor provided with means to remove periodically any precipitate therein, and a flash chamber to receive the oxidized residual waste liquor from the reactor.

In initiating the oxidation phase, the raw waste sulfite liquor was pumped into the reactor under a pressure of 1500 pounds per square inch and the waste sulfite liquor charge then heated by means of an oil ring to a temperature of at least 260 degrees centigrade.

12.2 tons of calcium oxide (lime) was added at a substantially uniform rate during the entire oxidation phase to the waste sulfite liquor charge to neutralize the free sulfur liberated in the reactor and to preclude the formation of sulfuric acid. Compressed air under pressure of 2000 pounds per square inch was then introduced into the reactor through a dispersion head, and thereafter the oxidation of the combustible materials, and thereafter the reaction was self-sustaining, requiring no further external heat, the rate of charging the reactor with raw waste sulfite liquor and the rate of introduction of compressed air being synchronized to insure the substantially complete oxidation of all the inorganic and organic constituents. About 970 tons of air was required to produce substantially complete oxidation of all the raw waste sulfite liquor.

The precipitated calcium sulfate and the calcium carbonate were periodically removed from the reactor, and the oxidized liquor from the reactor was continuously passed into a flash chamber, from which the fixed gases, i. e., nitrogen, carbon dioxide, and excess air, were vented off with steam at about 1500 pounds per square inch pressure. Three hundred tons of carbon dioxide, 670 tons of nitrogen, 1400 tons of steam and 400,000 gallons of liquid water were vented from the reactor in this manner. The liquid effluent from the flash chamber and the condensate steam with the mixed gases had an oxygen demand of less than two percent of the oxygen demand of the raw waste sulfite liquor.

51.5 tons of calcium sulfate precipitate and 5.7 tons of calcium carbonate precipitate were obtained from the reactor tower in the oxidation phase. These inorganic calcium salts were then roasted for a period of forty-five minutes in a kiln maintained at 1600 degrees centigrade. During the roasting procedure, 24.3 tons of sulfur dioxide gas, 2.5 tons of carbon dioxide gas and six tons of oxygen gas were vented from the roasting kiln, leaving a substantially pure residue of 24.4 tons of calcium oxide (CaO).

12.2 tons of the calcium oxide thus obtained from the substantially complete oxidation of the raw waste sulfite liquor and subsequent calcium sulfate and calcium carbonate roasting procedure was suspended in water and the 24.3 tons of sulfur dioxide also obtained in the roasting step, then introduced into the mixing tank to form 38.9 tons of cooking acid, the remaining calcium oxide, about 12 tons, being available to facilitate the oxidation in the tower reactor of sulfur to its highest state and to preclude the formation of sulfuric acid.

As a result of my novel method, it is possible to obtain from the raw waste sulfite liquor the almost theoretical amount of calcium oxide required to prepare a fresh quantity of calcium bisulfite cooking acid. This method is both efficient and economical since the by-product gases, carbon dioxide, nitrogen and steam can be utilized in other plant operations and since no further treatment of the liquid residue from the waste sulfite liquor oxidation is necessary, the residual liquid matter having an oxygen demand, as measured by the Standard Iodate Method, of less than two percent of the original biochemical oxygen demand of the raw waste sulfite liquor. In addition, substantial amounts of extra heat are produced in the oxidizer by the exothermic oxidation of the carbonaceous matter present in the raw waste sulfite liquor.

In the waste sulfite liquor oxidation step of my novel procedure, the quantity of free oxygen supplied is preferably that theoretically required to convert all of the organic combustible material to its end-product, viz., carbon dioxide. In general, at least one mole of oxygen per atom of carbon present in the raw waste sulfite matter should be used in the oxidation reactor. Other oxidizing media, such as compressed oxygen or other compressed gaseous materials capable of furnishing free oxygen, may be utilized, in addition to the air referred to in the example. In the oxidation step, the waste sulfite liquor can be pumped into the reactor at any pressure from about 1400 to 2000 pounds per square inch, 1500 pounds being the preferred embodiment since this pressure is sufficient to maintain substantially all of the waste sulfite liquor in the liquid phase.

A minimum reactor temperature of 160 degrees centigrade is necessary and a preferred temperature of from 230 to 330 degrees centigrade is utilized to initiate oxidation of the carbonaceous materials. After initiation, the oxidation proceeds exothermically so that no external heating is required, and, in fact, the waste sulfite liquor can be introduced into the reactor at a temperature of about twenty degrees centigrade, the exothermic heat from the oxidation being sufficient to raise the temperature of the carbonaceous material in the incoming waste sulfite liquor to the point where substantially complete oxidation will result.

The use in the oxidation step of about one-half the lime (CaO), produced in the roasting step, serves to neutralize the sulfur as it is being converted to its higher oxidation states in the reactor, and to preclude the formation of sulfuric acid, thus preventing corrosion of the steel reactor surfaces. In addition, this retardation of sulfuric acid formation prevents the precipitation of the lignin sulfonate, which precipitation, if permitted to occur, would make it extremely difficult to carry out aqueous phase oxidation.

In the roasting step of my novel method, the combustion kiln is maintained preferably at a temperature of at least 1600 degrees centigrade and less than a temperature at which sintering or fusing of the calcium oxide would result. A roasting temperature of 1280 degrees centigrade results in the conversion of 47–50 percent of the total sulfur to sulfur trioxide ($SO_3$), whereas a temperature of approximately 1600 degrees centigrade results in the conversion of about 99 percent of the total sulfur into the desired sulfur dioxide and in the complete exclusion of the sulfur trioxide.

Since the sulfites, sulfides, and thiosulfates are not formed in any significant amounts in the oxidation phase of my novel method, these sulfur salts of lower oxidation state are not present in the kiln. In the prior art procedures, these sulfides and thiosulfates were frequently formed from the partial oxidation methods, or in evaporation and concentration methods followed by combustion, and were usually present in the insoluble, infusible, ash, thereby hindering the leaching out of the desirable calcium salts useful in the preparation of fresh cooking acid. During the roasting operation in my novel procedure, make-up sulfur, which is readily converted to sulfur dioxide, can be added to replace any sulfur mechanically lost in the prior steps.

In the final step, i. e., the preparation of fresh quantities of calcium bisulfiate cooking acid, it is sometimes desirable to add a small amount of calcium oxide to compensate for those calcium losses resulting from clinker formation in the kiln in the roasting step and from the inevitable mechanical loss incurred in the earlier steps. This addition aids in maintaining the unique stoichiometric balance present in the oxidation phase in which one-half of the calcium oxide produced from the roasting operation is used to neutralize the waste sulfite liquor and the oxidation products of sulfur formed in the oxidation reactor, and in which the remaining one-half calcium oxide is utilized in the preparation of the fresh quantity of cooking acid in the final step of my novel procedure.

Various modifications may be made in the invention without departing from the spirit or scope thereof and it is to be understood that I limit myself only as defined in the appended claims.

I claim:
1. In a process for regenerating waste calcium bisulfite cooking acid to be used for digesting wood to yield pulp and waste sulfite liquor, the steps which include: substantially completely oxidizing, in the liquid phase, with free oxygen at a temperature above about 160 degrees centigrade a waste sulfite liquor neutralized with lime to produce calcium sulfate and calcium carbonate together with gaseous oxidation products and a liquid effluent; separating and roasting the calcium sulfate and calcium carbonate to obtain primarily sulfur dioxide as an evolved gas and calcium oxide as a solid residue; contacting water and the said calcium oxide to form a suspension thereof; and, introducing into said suspension the sulfur dioxide from the roasting step to form calcium bisulfite cooking acid.

2. In a process for regenerating waste calcium bisulfite cooking acid to be used for digesting wood to yield pulp and waste sulfite liquor, the steps which include: substantially completely oxidizing the liquid waste sulfite liquor with free oxygen to produce essentially calcium sulfate, calcium carbonate, carbon dioxide, nitrogen, steam and water; separating and roasting the mixed calcium sulfate and calcium carbonate to obtain a solid residue including calcium oxide and a gas mixture including sulfur dioxide, carbon dioxide, and oxygen; and, treating a suspension of the calcium oxide from the roasting step in water with the sulfur dioxide also from the roasting step to form calcium bisulfite cooking acid.

3. In a process for regenerating waste calcium bisulfite cooking acid to be used for digesting wood to yield pulp and waste sulfite liquor, the steps which include: substantially completely oxidizing with free oxygen a waste sulfite liquor, neutralized with lime, in the presence of liquid water at a temperature between about 230 and about 330 degrees centigrade and under a pressure of about 1500 to 2000 pounds per square inch to obtain calcium sulfate and calcium carbonate together with gaseous oxidation products and a liquid effluent; separating a mixture of the calcium carbonate and calcium sulfate; roasting the mixture at a temperature between 1280 and 1600 degrees centigrade to obtain essentially a residue of calcium oxide and a gas including sulfur dioxide; and treating a suspension of the calcium oxide from the roasting step in water with the sulfur dioxide from the roasting step to form calcium bisulfite cooking acid.

4. In a cyclic sulfite process wherein wood is digested with calcium bisulfite cooking acid to yield pulp and waste sulfite liquor, the steps in the regeneration of the calcium bisulfite cooking acid from calcium waste sulfite liquor which include: substantially completely oxidizing the aqueous calcium waste sulfite liquor with free oxygen at a temperature above about 160 degrees centigrade in the presence of calcium oxide; separating and roasting the insoluble inorganic calcium salts thus obtained to produce essentially a calcium oxide residue and evolved sulfur dioxide; and, treating an aqueous suspension of calcium oxide from the roasting step with sulfur dioxide to form fresh calcium bisulfite cooking acid.

References Cited in the file of this patent
UNITED STATES PATENTS

| Number | Name | Date |
|---|---|---|
| 1,183,152 | Withane et al. | May 16, 1916 |
| 1,807,320 | Merrill | May 26, 1931 |
| 2,029,616 | Haglund | Feb. 4, 1936 |
| 2,348,456 | Tomlinson | June 9, 1942 |